United States Patent
Frieder et al.

(10) Patent No.: US 11,693,885 B2
(45) Date of Patent: *Jul. 4, 2023

(54) CACHE OPTIMIZATION VIA TOPICS IN WEB SEARCH ENGINES

(71) Applicant: Georgetown University, Washington, DC (US)

(72) Inventors: Ophir Frieder, Chevy Chase, MD (US); Ida Mele, Latina (IT); Raffaele Perego, Pisa (IT); Nicola Tonellotto, Pisa (IT)

(73) Assignee: Georgetown University, Washington, DC (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/381,724

(22) Filed: Jul. 21, 2021

(65) Prior Publication Data

US 2021/0357434 A1    Nov. 18, 2021

Related U.S. Application Data

(63) Continuation of application No. 16/654,725, filed on Oct. 16, 2019, now Pat. No. 11,151,167, which is a
(Continued)

(51) Int. Cl.
| | |
|---|---|
| *G06F 16/00* | (2019.01) |
| *G06F 16/28* | (2019.01) |
| *G06F 16/2452* | (2019.01) |
| *G06N 20/00* | (2019.01) |
| *G06F 40/30* | (2020.01) |
| *G06F 16/953* | (2019.01) |

(52) U.S. Cl.
CPC ...... *G06F 16/285* (2019.01); *G06F 16/24522* (2019.01); *G06F 40/30* (2020.01); *G06N 20/00* (2019.01); *G06F 16/953* (2019.01)

(58) Field of Classification Search
None
See application file for complete search history.

(56) References Cited

U.S. PATENT DOCUMENTS

| | | | |
|---|---|---|---|
| 6,519,592 B1 | 2/2003 | Getchius | |
| 6,826,559 B1 | 11/2004 | Ponte | |

(Continued)

OTHER PUBLICATIONS

Beitzel, Steven M., et al., "Temporal Analysis of a Very Large Topically Categorized Web Query Log", Journal of the American Society for Information Science and Technology, 58(2):166-178, 2207, 13 pages.
(Continued)

*Primary Examiner* — Bai D Vu
(74) *Attorney, Agent, or Firm* — Smith Gambrell & Russell LLP

(57) ABSTRACT

Embodiments may provide a cache for query results that can adapt the cache-space utilization to the popularity of the various topics represented in the query stream. For example, a method for query processing may perform receiving a plurality of queries for data and requesting data responsive to at least one query from a data cache comprising a temporal cache, wherein the temporal cache is configured to store data based on a topic associated with the data and is configured to retrieve data based on a topic, and wherein the data cache is configured to retrieve data responsive to at least one query from the computer system.

18 Claims, 9 Drawing Sheets

Related U.S. Application Data continuation-in-part of application No. 16/408,766, filed on May 10, 2019, now Pat. No. 10,503,792.

(56) References Cited

U.S. PATENT DOCUMENTS

| | | |
|---|---|---|
| 6,848,026 B2 | 1/2005 | DeSota |
| 7,467,131 B1 | 12/2008 | Gharachorloo |
| 7,617,176 B2 | 11/2009 | Zeng |
| 7,840,547 B1 | 11/2010 | Tucker |
| 8,010,545 B2 | 8/2011 | Stefik |
| 8,290,926 B2 | 10/2012 | Ozzie |
| 8,375,049 B2 | 2/2013 | Bailey |
| 8,549,016 B2 | 10/2013 | Stefik |
| 8,560,562 B2 | 10/2013 | Kanefsky |
| 8,620,951 B1 | 12/2013 | He |
| 8,943,043 B2 | 1/2015 | Lymberopoulos |
| 9,135,354 B2 | 9/2015 | Broman |
| 10,083,248 B2 | 9/2018 | Broman |
| 2002/0032772 A1 | 3/2002 | Olstad |
| 2002/0078300 A1 | 6/2002 | Dharap |
| 2010/0042589 A1 | 2/2010 | Smyros |
| 2010/0057706 A1 | 3/2010 | Zhou |
| 2018/0034931 A1 | 2/2018 | Chakra |

OTHER PUBLICATIONS

Chen, Jay, et al., "Interactive Web Caching for Slow or Intermittent Networks", ACM DEV 4, ACM 978-1-4503-2558—May 13, 12, Dec. 6-7, 2013, Cape Town, South Africa, 10 pages.

Baeza-Yaies et al., "Design Trade-Offs for Search Engine Caching", ACM Transactions on the Web (TWEB), Oct. 2008, Retrieved on Jul. 7, 2019 from <http://pomino.isti.cnr.it/-silvestr/wp-content/uploads/2011/02/tweb2008.pdf> entire document; 28 pages.

Sivanandam et al. "Web Cache Optimization in Semantic Based Web Search Engine," In: International Journal of Computer Applications, Nov. 2010, Retrieved on Jul. 7, 2019 from <http://citeseerx.ist.osu.edu/viewdoc/download?doi-10.1.206.3431&rep=rep1&type=pdf> entire document; 6 pages.

Fig. 2
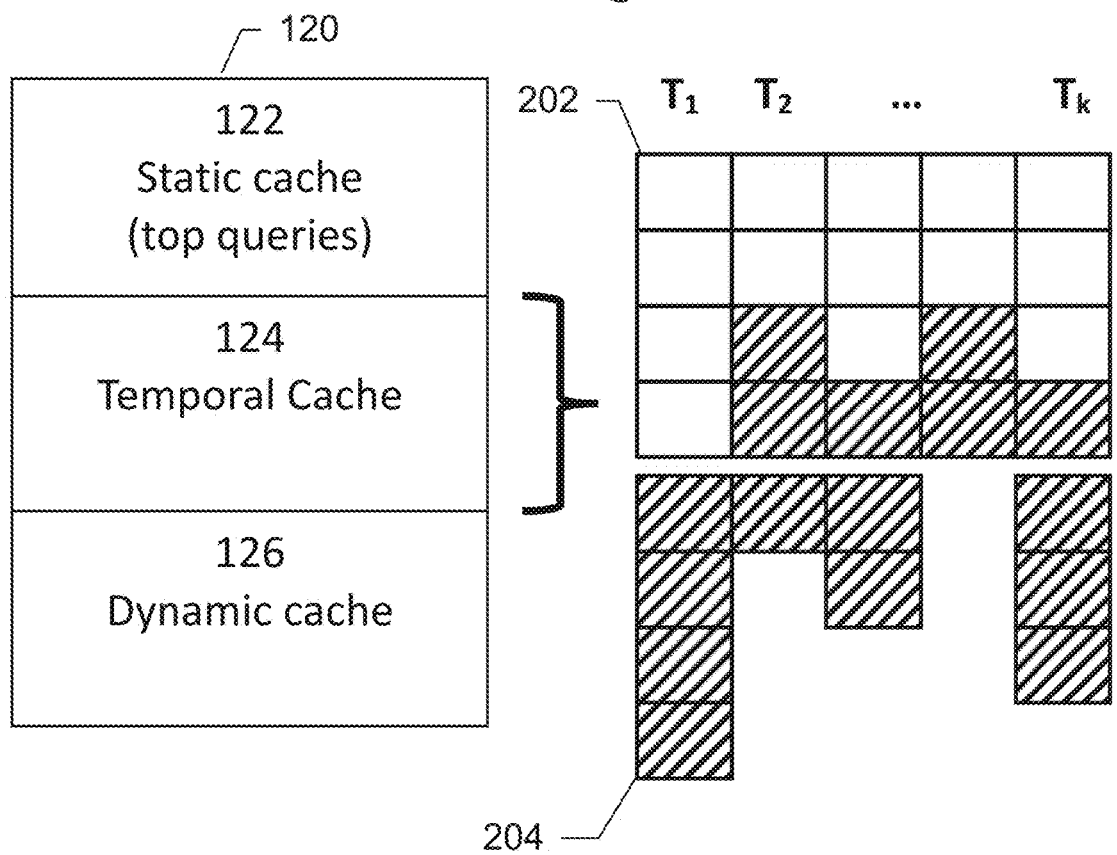
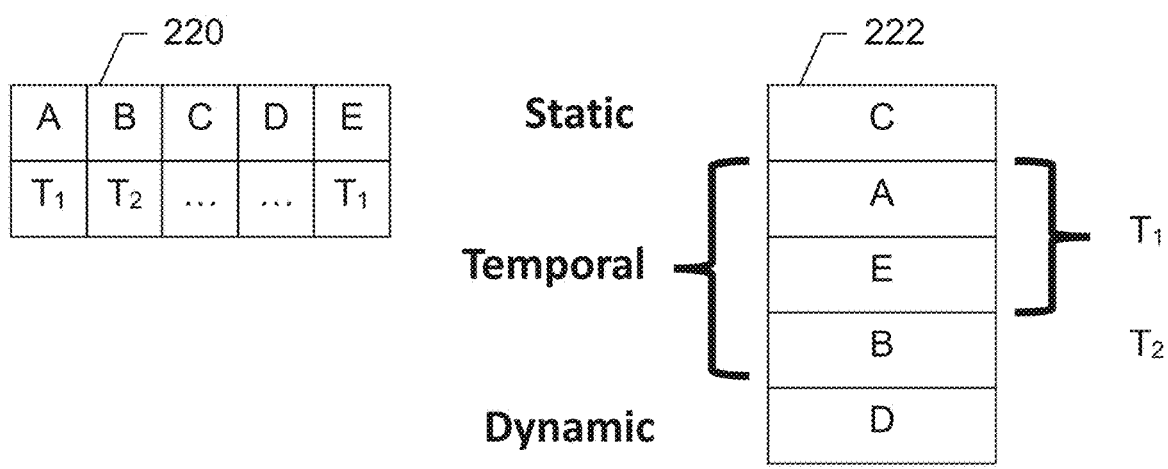

Fig. 3

---
Algorithm 1: The STD cache management process.

Input : A query $q$ and its topic $\tau$
Output: Hit or miss and updated STD cache 301 if $q$ in S then
302     return hit
303 if $\tau$ in $\{T_1, \ldots, T_k\}$ then
304     if $q$ in $T.\tau$ then
305        update $T.\tau$ and return hit
    else
306        update $T.\tau$ and return miss
307 if $q$ in D then
308     update D and return hit
   else
309     update D and return miss

---

300

Fig. 4
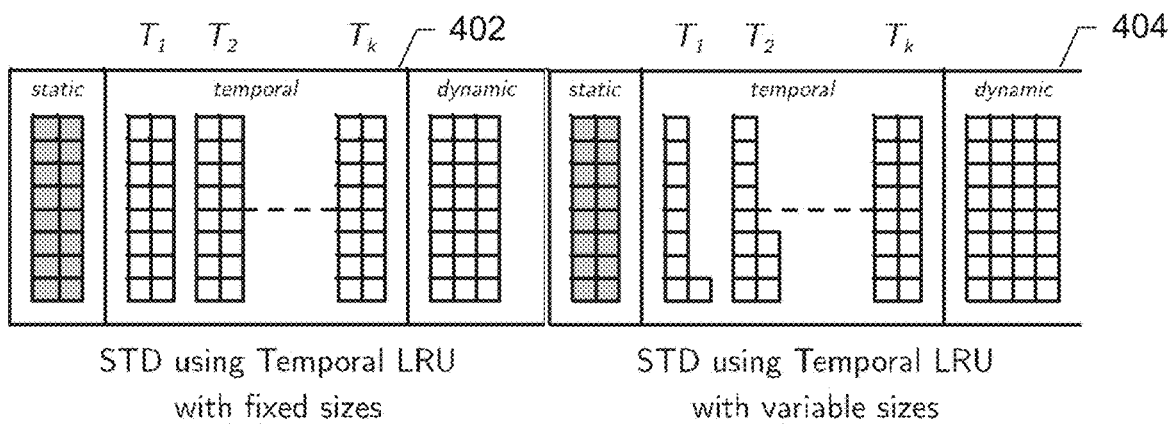
STD using Temporal LRU with fixed sizes
STD using Temporal LRU with variable sizes
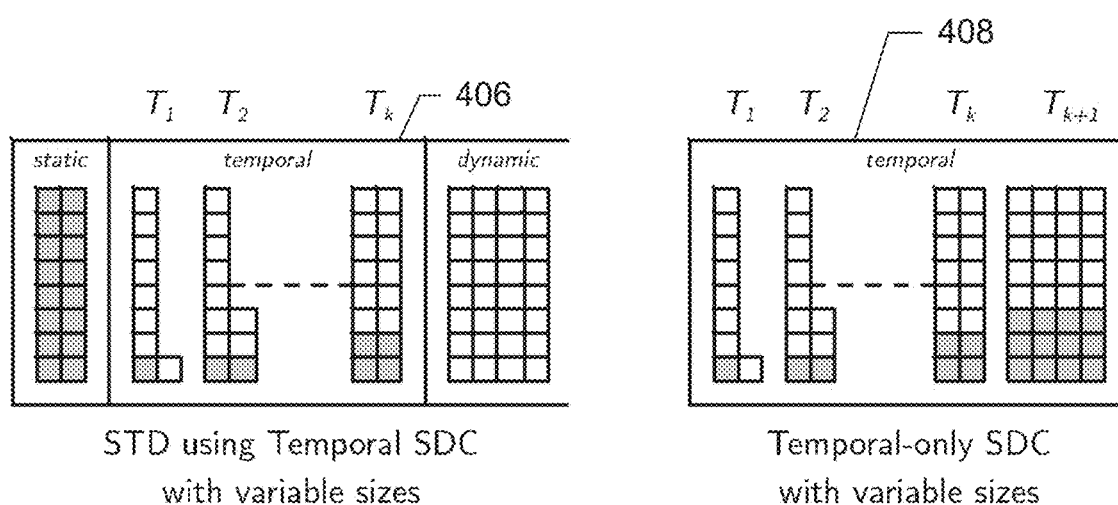
STD using Temporal SDC with variable sizes
Temporal-only SDC with variable sizes

| Algorithm 2: The LDA generative process. |
|---|
| 501 for each document $d$ do |
| 502      Draw $\theta_d \sim \text{Dir}(\alpha)$ |
| 503      for each word position $n$ do |
| 504          Draw a topic $z_{d,n} \sim \text{Multinomial}(\theta_d)$ |
| 505          Draw a word $w_{d,n} \sim \text{Multinomial}(\beta | z_{d,n})$ |

500

Fig. 8
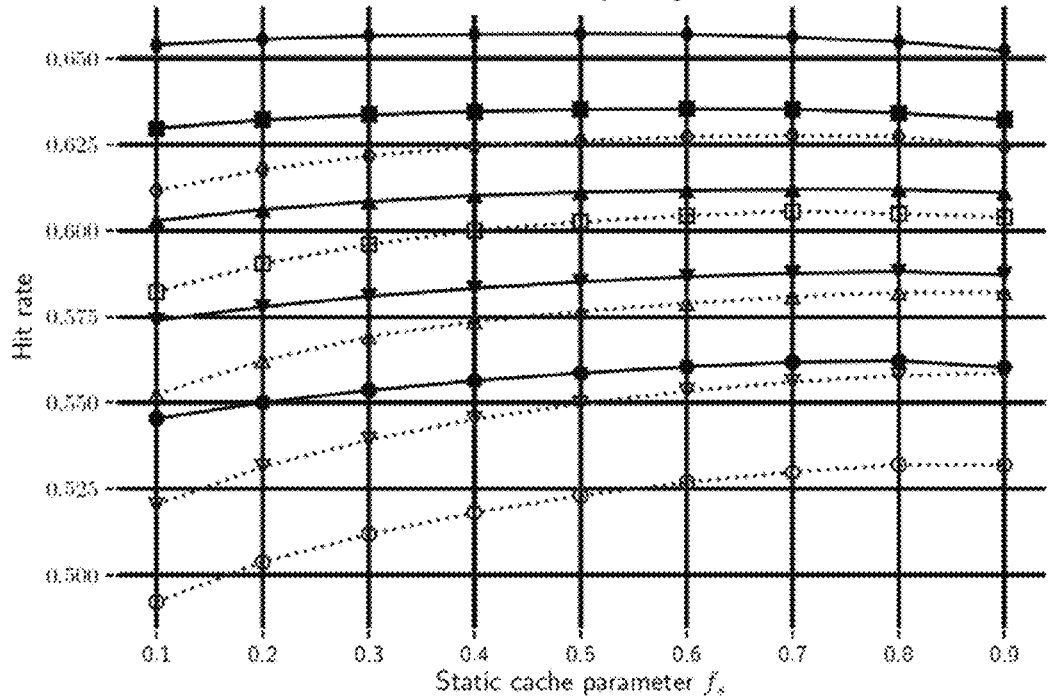
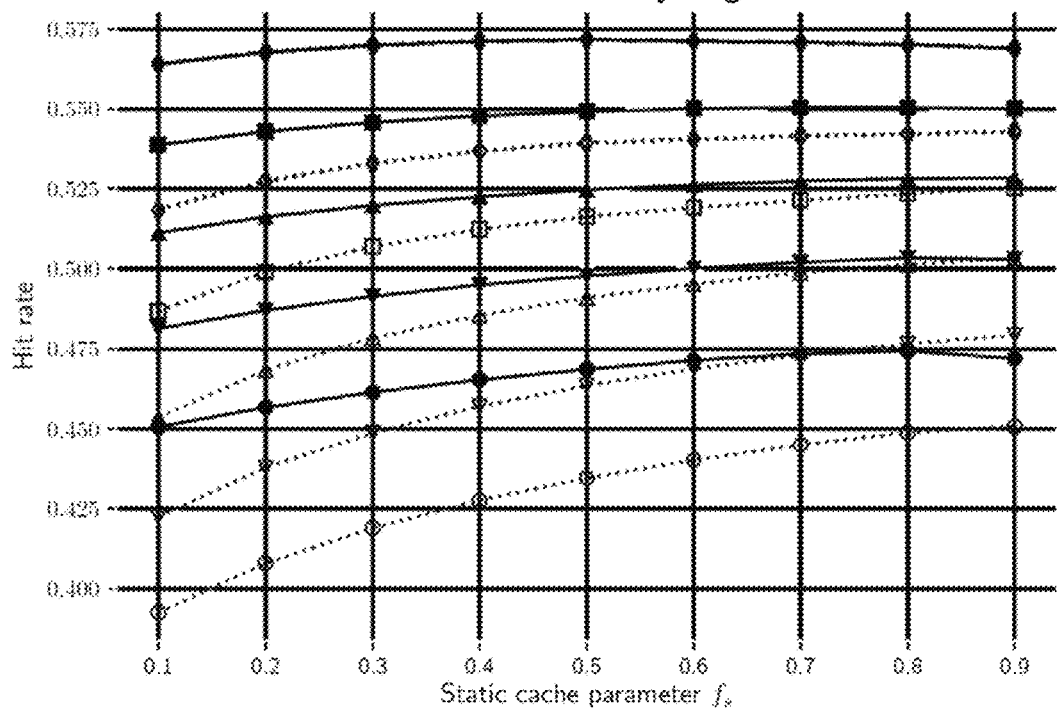

CACHE OPTIMIZATION VIA TOPICS IN WEB SEARCH ENGINES

CROSS-REFERENCE TO RELATED APPLICATIONS

This application is a Continuation of U.S. application Ser. No. 16/654,725, filed Oct. 16, 2019, now U.S. Pat. No. 11,151,167, issued Oct. 19, 2021, which is a Continuation-in-Part of U.S. Pat. No. 10,503,792, issued Dec. 10, 2019, the contents of all of which are incorporated herein in their entirety.

BACKGROUND

The present invention relates to techniques for providing a cache for query results that may adapt the cache-space utilization to the popularity of the various topics represented in the query stream.

Caching of search results is often employed in information retrieval systems and Web search engines to expedite query processing and reduce back-end server workload. Caching is a fundamental architectural optimization strategy, and query-result caching is important for Web search efficiency. Result caching, as its name implies, stores the results of some selected user queries in a fast-access memory (cache) for future reuse. When a query is requested, the cached results are directly returned to the user without reprocessing the request. Result caching improves the main efficiency-performance metrics of search engines, namely, latency and throughput. Indeed, serving a query with previously cached results decreases the latency perceived by the user as well as avoids the usage of computational resources with a consequent improvement of the search engine throughput.

Another advantage of caching query results is the reduction of energy consumption as cached queries do not need to be reprocessed by the back-end servers. Although other energy-efficiency optimization schemes exist, these approaches are complementary to result caching and not a contradictory alternative. Given desired and imposed "Green Policy" restrictions and the significant economic benefits due to the energy conservation, the interest of the search industry in energy saving is high. Energy wise, the cost of a cached query is typically assumed to be close to nothing, while a search of a query costs proportionally to its processing time in combination with the electricity price at the time of processing.

The main challenge in result caching is the identification of those queries whose results should be cached. However, via query log mining, high temporal locality may be observed in the query stream, enabling effective search-engine side caching of popular query results, such as, results of queries frequently requested in the past by different users. The result cache can be static or dynamic. A static cache is periodically populated in an offline manner, with the results of past, most-popular queries. Query popularity is estimated observing previously submitted queries in Web or other related search logs; a simplifying, but not always correct, core assumption is that queries popular in the past remain popular in the future. A dynamic cache, as the name suggests, is dynamically updated; when the cache is full and a new element is to be stored, an eviction/replacement policy is applied to decide which cache element must be removed to make space for the new one. The most common replacement policy for dynamic caches is the Least Recently Used (LRU) strategy: every time a query is submitted, the cache is updated, keeping track of what query was used and when; if necessary, the cache entry used least recently is evicted to vacate space for the new entry. The LRU strategy is effective without global knowledge and captures the "bursty" behavior of the queries by keeping recent queries in the cache and replacing those queries that are not requested for a long period of time.

Static and dynamic caches can be combined together. For example, in a Static-Dynamic Cache (SDC), the cache space is divided into two portions. The static portion stores results of the most popular queries. The dynamic portion maintains currency by applying LRU or other replacement strategies, for example, but not limited to, First In First Out (FIFO). This hybrid approach has proved successful in improving the performance of result caching with respect to both static and dynamic caching solutions in isolation. Despite its good performance, SDC suffers from some issues. Static caching captures highly frequent queries, while dynamic caching captures bursts of recently submitted queries. That is, static caching captures past queries that are popular over a relatively large time span (such as days or weeks) while dynamic caching might fail to capture such long-term temporal locality, but does capture short-term popularity. However, a query might not be sufficiently globally popular to be cached in the static cache and not be requested so frequently within a burst mode to be kept in the dynamic cache, but it might become relatively popular over a specific time interval, say a few hours in the early morning or several weekday evening hours. For example, a query on a specific topic, such as weather forecast, is typically submitted in the early morning hours or at the end of a work day, but relatively seldom in the remaining hours of a day.

Accordingly, a need arises for techniques that provide caching of queries that are not sufficiently globally popular to be cached in a static cache and are not requested frequently enough within a short time interval, namely are not sufficiently "bursty", to be kept in a dynamic cache.

SUMMARY

Embodiments of the present systems and methods may provide techniques that provide caching of queries that are not sufficiently globally popular to be cached in a static cache and are not requested frequently enough within a short time interval to be kept in a dynamic cache. Embodiments of the present systems and methods may provide a cache for query results that can adapt the cache-space utilization to the popularity of the various topics represented in the query stream. Queries may be grouped based on broad topics (such as the queries "forecast" and "storm" belong to the topic weather, while queries "faculty" and "graduate" to the topic education), and queries belonging to different topics might have different temporal-locality patterns. The topic popularity may be represented by the number of distinct queries belonging to the topic; to capture the specific locality patterns of each topic, the cache entries may be split among the different topics proportionally to their popularity. This may provide queries belonging to frequently requested topics greater retention probability in the dynamic cache.

For example, in an embodiment, a method for query processing may be implemented in a computer system comprising a processor, a memory configured to store program instructions and data, and program instructions executable by the processor to perform: receiving a plurality of queries for data, determining at least one topic associated with each query, and requesting data responsive to each query from a data cache comprising a plurality of partitions, wherein there are at least a static cache partition, a dynamic cache partition, and a temporal cache partition, wherein the temporal cache partition is configured to store data based on a topic associated with the data, wherein the temporal cache partition is further partitioned into a plurality of topic portions, each portion configured to store data relating to an associated topic, wherein the associated topic is selected from among determined topics of queries received by the computer system, and wherein the data cache is configured to retrieve data responsive to at least some queries from the computer system.

In embodiments, each topic portion may be further partitioned into a static portion configured to store data entries indefinitely and into a dynamic portion configured to store data entries until each least recently used data entry is replaced by a newer data entry. More so, the topic portion may further be partitioned, recursively as disclosed, with further refinements of the given topic into corresponding sub-topics. The at least one topic associated with each query may be determined using a Latent Dirichlet Allocation. The temporal cache partition may be configured to be trained using a plurality of training queries associated with a plurality of topics.

In an embodiment, a system for query processing may comprise a computer system comprising a processor, a memory configured to store program instructions and data, and program instructions executable by the processor to receive a plurality of queries for data, to determine at least one topic associated with each query, and to request data responsive to each query from a data cache, the data cache may comprise a plurality of partitions, wherein there are at least a static cache partition, a dynamic cache partition, and a temporal cache partition, wherein the temporal cache partition is configured to store data based on a topic associated with the data, wherein the temporal cache partition is further partitioned into a plurality of topic portions, each portion configured to store data relating to an associated topic, wherein the associated topic is selected from among determined topics of queries received by the computer system, and wherein the data cache is configured to retrieve data responsive to at least some queries from the computer system.

In an embodiment, a computer program product for query processing, the computer program product may comprise a non-transitory computer readable storage having program instructions embodied therewith, the program instructions executable by a computer, to cause the computer to perform a method comprising: receiving a plurality of queries for data, determining at least one topic associated with each query, and requesting data responsive to each query from a data cache comprising a plurality of partitions, wherein there are at least a static cache partition, a dynamic cache partition, and a temporal cache partition, wherein the temporal cache partition is configured to store data based on a topic associated with the data, wherein the temporal cache partition is further partitioned into a plurality of topic portions, each portion configured to store data relating to an associated topic, wherein the associated topic is selected from among determined topics of queries received by the computer system, and wherein the data cache is configured to retrieve data responsive to at least some queries from the computer system.

In an embodiment, a method for query processing may be implemented in a computer system comprising a processor, a memory configured to store program instructions and data, and program instructions executable by the processor to perform receiving a plurality of queries for data, and requesting data responsive to each query from a data cache comprising a plurality of partitions, wherein there are at least a static cache partition configured to retrieve data based on a query, a dynamic cache partition, and a temporal cache partition, wherein the temporal cache partition is configured to store data based on a topic associated with the data and is configured to retrieve data based on a topic, wherein the temporal cache partition is further partitioned into a plurality of topic portions, each portion configured to store data relating to an associated topic, wherein the associated topic is selected from among determined topics of queries received by the computer system, and wherein the data cache is configured to retrieve data responsive to at least some queries from the computer system.

In an embodiment, a method for query processing may be implemented in a computer system comprising a processor, a memory configured to store program instructions and data, and program instructions executable by the processor to perform receiving a plurality of queries for data and requesting data responsive to at least one query from a data cache comprising a plurality of partitions, wherein there are at least a static cache partition configured to retrieve data based on a query, a dynamic cache partition, and a temporal cache partition, wherein the temporal cache partition is configured to store data based on a topic associated with the data and is configured to retrieve data based on a topic, wherein the temporal cache partition is further partitioned into a plurality of topic portions, each portion configured to store data relating to an associated topic, wherein the associated topic is selected from among determined topics of queries received by the computer system, and wherein the data cache is configured to retrieve data responsive to at least some queries from the computer system, wherein requesting the data responsive to the at least one query from the data cache may comprise requesting data responsive to the at least one query from the static cache partition using the at least one query and when the requested data are not found in the static cache partition, determining at least one topic associated with the at least one query and requesting data responsive to the at least one query from the temporal cache partition using the at least one determined topic.

In embodiments, a system for query processing may comprise a computer system comprising a processor, a memory configured to store program instructions and data, and program instructions executable by the processor to perform receiving a plurality of queries for data; and requesting data responsive to at least one query from a data cache comprising a plurality of partitions, wherein there are at least a static cache partition configured to retrieve data based on a query, a dynamic cache partition, and a temporal cache partition, wherein the temporal cache partition is configured to store data based on a topic associated with the data and is configured to retrieve data based on a topic, wherein the temporal cache partition is further partitioned into a plurality of topic portions, each portion configured to store data relating to an associated topic, wherein the associated topic is selected from among determined topics of queries received by the computer system, and wherein the data cache is configured to retrieve data responsive to at least some queries from the computer system, wherein requesting the data responsive to the at least one query from the data cache comprises requesting data responsive to the at least one query from the static cache partition using the at least one query and when the requested data are not found in the static cache partition, determining at least one topic associated with the at least one query and requesting data responsive to the at least one query from the temporal cache partition using the at least one determined topic.

In an embodiment, a method for query processing may be implemented in a computer system comprising a processor, a memory configured to store program instructions and data, and program instructions executable by the processor to perform: receiving a plurality of queries for data and requesting data responsive to at least one query from a data cache comprising a temporal cache, wherein the temporal cache is configured to store data based on a topic associated with the data and is configured to retrieve data based on a topic, and wherein the data cache is configured to retrieve data responsive to at least one query from the computer system.

In embodiments, the data cache may further comprise either a static cache or a dynamic cache. The temporal cache partition may be further partitioned into a plurality of topic portions. Each topic portion may be configured to store data relating to an associated topic. The associated topic may be selected from among determined topics of queries received by the computer system. Each topic portion may be further partitioned into a static portion configured to store data entries indefinitely, and into a dynamic portion configured to store data entries until each least recently used data entry is replaced by a newer data entry.

In an embodiment, a method for query processing may be implemented in a computer system comprising a processor, a memory configured to store program instructions and data, and program instructions executable by the processor to perform: receiving a plurality of queries for data and requesting data responsive to at least one query from a data cache comprising a temporal cache, wherein the temporal cache is configured to store data based on a topic associated with the data and is configured to retrieve data based on a topic, and wherein the data cache is configured to retrieve data responsive to at least some queries from the computer system, wherein requesting the data responsive to the at least one query from the data cache comprises: determining at least one topic associated with the at least one query and requesting data responsive to the at least one query from the temporal cache using the at least one determined topic.

In an embodiment, system for query processing may comprise a computer system comprising a processor, a memory configured to store program instructions and data, and program instructions executable by the processor to perform: receiving a plurality of queries for data and requesting data responsive to at least one query from a data cache comprising a temporal cache, wherein the temporal cache is configured to store data based on a topic associated with the data and is configured to retrieve data based on a topic, and wherein the data cache is configured to retrieve data responsive to at least one query from the computer system.

BRIEF DESCRIPTION OF THE DRAWINGS

The details of the present invention, both as to its structure and operation, can best be understood by referring to the accompanying drawings, in which like reference numbers and designations refer to like elements.

FIG. 2 is an exemplary diagram of a Static-Temporal-Dynamic (STD Cache, according to embodiments of the present systems and methods.

FIG. 3 illustrates an exemplary process of operation of a Static-Temporal-Dynamic (STD) Cache, according to embodiments of the present systems and methods.

FIG. 4 is an exemplary diagram of different configurations of an STD cache, according to embodiments of the present systems and methods.

FIG. 8 illustrates exemplary hit rates of SDC and $STD_{SDC}^v$ for different values of N and of $f_s$, for the query logs, according to embodiments of the present systems and methods.

DETAILED DESCRIPTION

Figure 1:
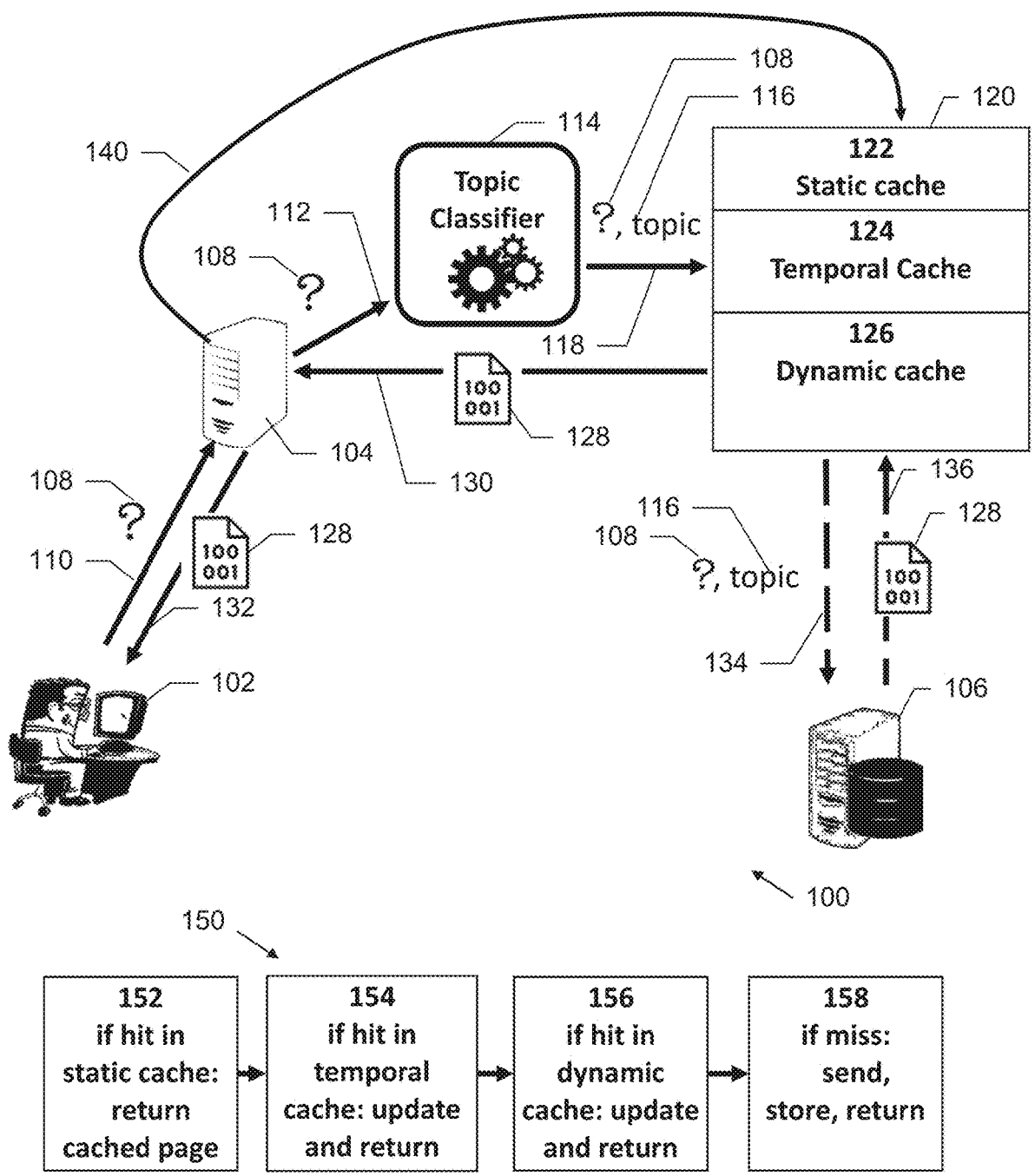
FIG. 1 illustrates an exemplary environment in which embodiments of the present systems and methods may be implemented.

Embodiments of the present systems and methods may provide techniques that provide caching of queries that are not sufficiently globally popular to be cached in a static cache and are not requested frequently enough within a short timeframe to be kept in a dynamic cache. Embodiments of the present systems and methods may provide a cache for query results that can adapt the cache-space utilization to the popularity of the various topics represented in the query stream. Queries may be grouped based on broad topics (such as the queries "forecast" and "storm" belong to the topic weather, while queries "faculty" and "graduate" to the topic education), and queries belonging to different topics might have different temporal-locality patterns. The topic popularity may be represented by the number of distinct queries belonging to the topic; to capture the specific locality patterns of each topic, the cache entries may be split among the different topics proportionally to their popularity. This may provide queries belonging to frequently requested topics greater retention probability in the dynamic cache.

As an illustrative example, consider a cache with size 2 and the query stream A B C A D E A F G, where query A, for example, is about a specific topic. A classical LRU replacement strategy will get a 0% hit rate (all queries will cause a miss). Instead, using 1 entry for the temporal cache and 1 entry for the dynamic LRU based cache will provide a 22.2% hit rate (the first occurrence of A causes a miss, the other two occurrences will cause two hits in the temporal cache).

The temporal cache may be combined with a static cache in different configurations. For example, the SDC approach may be improved by adding yet an additional cache space partition that stores results of queries based on their topics. Embodiments may be called Static-Temporal containing temporal cache-Dynamic cache (STD). To detect the query topics and incorporate them in the caching strategy, embodiments may rely on the standard topic modeling approach called Latent Dirichlet Allocation (LDA). It is within the scope of this invention to rely on any other known in the art topic modeling approaches including but not limited to probabilistic latent semantic analysis (PLSA) or hierarchical latent tree analysis (HLTA). LDA gets as input a document collection and returns lists of keywords representing the topics discussed in the collection. Each document n our setting consists of the query keywords and the textual content of their clicked results. Given the topics, the queries can be classified into topical categories, and we estimate the topic popularity observing the number of distinct queries belonging to that topic.

Embodiments of the present systems and methods may cluster queries to capture their different temporal localities. For example, queries may be clustered by topic, such as weather, sport, entertainment, etc. Further, in embodiments, queries may be clustered by factors such as geographic demographic/behavioral/nature/etc. The human brain can easily infer the topic from a natural-language text, such as sport, politics, etc., while for a computer, topic detection is challenging. For example, known unsupervised approaches can be used for discovering topics from large text corpora using a distribution hypothesis: words that occur in similar context have similar meaning. Given a set of topics and a query, a topic classifier may be used to find the topic.

Embodiments may provide a STD Cache, which may include a Static-Dynamic Cache plus an extra layer for capturing the temporal localities of queries belonging to the same topic.

Example: queries about weather (e.g., weather forecast, storm) have temporal patterns different from other queries and are captured in a particular portion of the temporal cache.

METHODOLOGY. Embodiments of the present systems and methods may provide a query-result caching strategy based on user search topics. In embodiments, the caching architecture may include different implementation configurations and also may utilize a query topic extraction approach. In embodiments, the cache may store the Search Engine Results Pages (SERPs) of the queries. For simplicity, in this disclosure, the terms query results or just results may be used to refer to the content of a cache entry.

An exemplary environment 100 in which embodiments of the present systems and methods may be implemented is shown in FIG. 1. In this example, environment 100 may include a user operating one or more user computer systems 102, one or more caching servers 104, and one or more web search servers 106. User computer systems 102 may include one or more computer systems that may be operated by users to generate and submit queries for information, as well as to receive and display query results. User computer systems may include any type of device including computing functionality, such as personal computers, laptops, smartphones, tablet computers, etc. Caching server 104 may include one or more server computer systems that provide caching functionality. Typically, caching server 104 may be implemented as a network of computer systems, but may include any number of computer systems, including only one, computer system. Web search server 106 may include one or more server computer systems that provide web search functionality. Typically, web search server 106 may be implemented as a network of computer systems, but may include any number of computer systems, including only one, computer system.

A user at user computer system 102 may generate a query 108 for information and transmit 110 query 108 to caching server 104. Caching server 104 may send 112 query 108 to topic classifier 114 for determination of a topic or topics 116 associated with query 108. Topic classifier 114 may access or send 118 query 108 and topic(s) 116 to cache 120. Cache 120 may include a plurality of partitions, including static cache 122, temporal cache 124, and dynamic cache 126, further described below. If information related to query 108, as associated with topic 116, is found in cache 120, then that information, as search results 128 for query 108, may be returned 130 to caching server 104 and further returned 132 to user computer system 102. If information related to query 108, as associated with topic 116, is not found in cache 120, then query 108 and topic(s) 116 may be sent 134 to web search server 106, which may return 136 search results 128 for query 108, to cache 120, which may store some or all of search results in the temporal cache 124 or dynamic cache 126, and may return 130 search results 128 to caching server 104 and further return 132 search results 128 to user computer system 102.

As shown in FIG. 1, cache 120 may include a plurality of partitions, including static cache 122, temporal cache 124, and dynamic cache 126 to implement topic-based caching. Given the total number N of cache entries available for storing the results of past queries, embodiments may provide a Static-Temporal-Dynamic (STD) cache which may include the following components:

A static cache 122 S of size $|S|=f_s \cdot N$ entries is used for caching the results of the most frequently requested queries. The static cache S is updated periodically with the fresh results of the top frequent $|S|$ queries submitted in the previous time frame (e.g., the previous week or month). This static cache 122 may serve very popular queries such as navigational ones.

A temporal cache 124 $\mathcal{T}$ of size $|\mathcal{T}|=f_t \cdot N$ entries, which may be in turn be partitioned into k topic-based sections $\mathcal{T}.\tau$, with $\tau \in \{T_1, T_2, \ldots, T_k\}$, where k is the number of distinct topics. Each section $\mathcal{T}.\tau$ may be considered as an independent cache, managed with some caching policy, and aimed at capturing the specific temporal locality of the queries belonging to a given topic, such as queries more frequent in specific time intervals or with periodic "burstiness", such as queries on weather forecasting, typically issued in the morning, or queries on sport events, typically issued during the weekend.

A dynamic cache 126 D of size $|D|=f_d \cdot N$. The dynamic cache D may be managed using some replacement policy, such as LRU. It is expected to store the results of "bursty" queries, such as queries requested frequently for a short period of time, which are not captured by either S or $\mathcal{T}$ as they are not sufficiently popular or are unassigned to any of the k topics.

Queries may not be assigned to a topic for two reasons: (i) the query was never seen before, hence topic classifier 114 fails to detect its topics, or (ii) even though it was already submitted in the past, no topic was assigned to it due to a very low classification confidence, as further described below.

The parameters $f_s$, $f_t$, and $f_d$ denote the fractions of entries N devoted to the static, temporal, and dynamic caches, respectively, so that $f_s+f_t+f_d=1$. Note that, $f_t=0$, the STD cache becomes the classical SDC cache. The number of entries in each section $\mathcal{T}.\tau$ of the temporal cache 124 may be fixed, such as $|\mathcal{T}.\tau|=|\mathcal{T}|/k$, for every $\tau \in \{T_1, T_2, \ldots, T_k\}$, or may be chosen on the basis of the popularity of the associated topic (observed in a past query stream). In the latter case, the topic popularity may be modeled as the number of distinct queries in the topic since estimating this number allows assignment to the topic a number of entries proportional to its requested queries. This may provide a more efficient utilization of the cache space since queries belonging to a popular topic have greater chances to be retained in the cache as their topic receives more entries as compared to other queries belonging to unpopular topics.

An exemplary process of STD cache operation 150 is shown in FIG. 1. Process 150 begins with 152, in which, in response to receiving a query, STD cache 120 may determine whether the query results are present in the static cache 122, that is, whether there is a hit in static cache 122. If so, STD cache 120 may return the cached page or pages from static cache 122 in response to the query. At 154, STD cache 120 may determine whether there is a hit in temporal cache 124. If so, STD cache 120 may update temporal cache 124 to indicate the query and hit, and may return the cached page or pages from temporal cache 124 in response to the query. At 156, STD cache 120 may determine whether there is a hit in dynamic cache 126. If so, STD cache 120 may update dynamic cache 126 to indicate the query and hit, and may return the cached page or pages from dynamic cache 126 in response to the query. It is within the scope of this invention that the order by which the static, temporal, and dynamic caches are examined for content may be modified. That is, it is possible for the dynamic cache to be examined 156 prior to examining the temporal cache 154. Without limitation, such reordering might be advantageous should the majority of the queries fail to be classified in terms of topic. More so, it is also within the scope of this invention that the ordering of cache examination processing in its entirety 152, 154, and 156 can be as illustrated or reordered into any combination thereof. At 158, if there is a miss in all caches, STD cache 120 may send a request for one or more pages of results to one or more web search servers 106, receive and store the results from web search servers 106, and return the received page or pages in response to the query.

In embodiments, a topic may not be determined for all received queries. For example, a topic may not be needed to access static cache 122. In embodiments, caching server 104 may send or use 140 query 108 to access static cache 122 to obtain information related to query 108. In embodiments, if information related to query 108 is found in static cache 122, then that information, as search results 128 for query 108, may be returned 130 to caching server 104 and further returned 132 to user computer system 102. If information related to query 108 is not found in static cache 122, then caching server 104 may send 112 query 108 to topic classifier 114 for determination of a topic or topics 116 associated with query 108. Topic classifier 114 may access or send 118 query 108 and topic(s) 116 to cache 120, which may access temporal cache 124 and/or dynamic cache 126 to obtain information related to query 108, as associated with topic 116. It is to be noted that embodiments of this invention may reorganize the order by which the static, temporal, and dynamic caches are examined.

An exemplary diagram of a Static-Topic-Dynamic (STD) Cache 120 is shown in FIG. 2. As shown, STD cache 120 may include a static cache portion 122, a temporal cache portion 124, and a dynamic cache portion 126. The temporal cache 124 may be divided into k portions $T_1$-$T_k$ (one for each topic). In embodiments, the size of each portion may depend on the popularity of the topic in a particular temporal window. In this example, temporal cache 124 may be configured in an SDC configuration. For example, a portion of the entries for each topic may be static, while the remaining portion of the entries for each topic may be dynamic and managed, for example, using LRU. In the example shown in FIG. 2, topic $T_1$ may include a plurality of static entries 202 and a plurality of dynamic entries 204, but all entries may be related to topic $T_1$. The temporal cache 124 may be similarly configured for each other topic $T_2$-$T_k$. In embodiments, each topic portion $T_1$-$T_k$ may be further partitioned with further refinements of the given topic into corresponding sub-topics. The partitioning may be recursive, as the sub-topics, sub-sub-topics, etc., may further be partitioned with further more specific refinements of the given topic.

An example of operation of STD cache 120 is shown in FIG. 2. In this example, a query stream may include a training stream including queries A B C D C E B C, and a test stream including queries B B C A C D. Given the training stream, a topic may be assigned to each query. Query keywords may be enriched with the content of the clicked page, and LDA may be performed to extract topics. An exemplary Query Topic Assignment 220 is shown as follows A-$T_1$, B-$T_2$, and E-$T_1$. An exemplary cache 222 has a size of 5 entries, assigned with one entry for static cache, three entries for temporal cache, and one entry for dynamic cache. In this example, as the most frequent query in the training stream is C, it goes in the static cache. In this example, the number of topics is 2 and the topic popularity is $T_1$: 2 (A, E)→2 entries, $T_2$: 1 (B)→1 entry. Queries without a topic or static cache assignment, such as D, go in the dynamic cache.

An exemplary process 300 of management of an STD cache is shown in FIG. 3. When a query q with its topic $\tau \in \{T_1, T_2, \ldots, T_k\}$ arrives, at 301, the cache manager may first check whether query q is in the static cache S. If so, at 302, the process may return a hit. Otherwise, at 303, if the query has a topic handled by the cache, then at 304, the cache manager may check the topic-specific section of the temporal cache $\mathcal{T}.\tau$, and at 305, may update the temporal cache with its specific replacement policy if necessary, and return a hit, or at 306, return a miss if the query was not cached in the temporal cache. If the query was not assigned to any topic, the dynamic cache D may be responsible for managing the query and at 307, the dynamic cache D may be checked, and at 308 may update the topic dynamic with its specific replacement policy if necessary, and return a hit, or at 309 return a miss if the query was not cached in the dynamic cache. As previously noted, other embodiments of this invention may reorganize the order by which the static, temporal, and dynamic caches are examined. The example shown in FIG. 3 does not detail the retrieval of the query results from the cache or the processing of the inverted index of the search engine in case of hit or miss, respectively, although embodiments of the present systems and methods may perform such functions.

The cache misses may incur different costs since some queries are more expensive to process than others term of time and resources). The performance analysis of some embodiments may be simplified to focus on the hit rate, considering all the misses with the same cost. In embodiments that focus on determining which element must be evicted from the dynamic cache or admitted to the static cache, the cost of the misses may be taken into account. Such embodiments, which may include these strategies, based on how costly is the computation of query results, may be used with embodiments of the caching architecture to improve their performance.

STD Cache Configurations. Embodiments may include a cache model that may be implemented in different ways, depending on several parameters such as the values of $f_s$, $f_t$, and $f_d$, the number of entries assigned to each topic in the temporal cache 124, the replacement policy adopted, and so on. Examples of some of these implementations are shown in FIG. 4.

Among the examples of embodiments of cache implementations shown in FIG. 4 are STD with temporal cache managed by LRU with fixed size ($STD_{LRU}^f$) 402. Cache embodiment 402 may include the static, topic, and dynamic caches discussed above. The temporal cache entries may be divided equally among the different topics without taking into account the topic popularity, and each temporal cache section may be managed according to the LRU replacement policy. STD with temporal cache managed by LRU with variable size ($STD_{LRU}^v$) 404 is similar to cache embodiment 402 with the difference that each topic has a number of entries proportional to its popularity. The topic popularity may be quantified as the number of distinct queries that belong to the topic in the training set of the query log. STD with temporal cache managed by SDC with variable entry size ($STD_{SDC}^v$) 406 is similar to cache embodiment 404, but now the temporal cache may be managed by SDC instead of LRU. Each topic may get a given number of entries proportional to its topic popularity, and all temporal cache sections may be split in a static and dynamic cache. The fraction of entries allocated to the static portion of these caches may be a constant fraction of the temporal cache entries and denoted with $f_t^s$. The remaining entries allocated for the topic are managed by LRU. Also shown is a topic-only cache managed by SDC with variable entry size ($T_{SDC}^v$) 408. This is an alternative version of the previous implementation since the queries with no topic are managed as queries belonging to an additional topic k+1. This means that instead of having a predefined size for static and dynamic caches, the number of entries would depend on the number of queries without a topic. Note that these are merely exemplary configurations of an STD cache.

Modeling Queries as Topics. Query topic categorization of user queries is well addressed within Web companies to increase effectiveness, efficiency, and revenue potential in general-purpose Web search engines. To distill the topics of the queries in the query logs, Latent Dirichlet Allocation (LDA) topic modeling may be used. LDA is an unsupervised approach not requiring any prior knowledge of the domain for discovering the latent topics.

Figure 5:
FIG. 5 illustrates an exemplary process of Latent Dirichlet Allocation (LDA) generation, according to embodiments of the present systems and methods.

Latent Dirichlet Allocation (LDA). An exemplary process 500 of LDA generation is shown in FIG. 5. Given a collection of documents and the number k of topics, LDA generation process 500 may return k lists of keywords, each representing a latent topic. At 501, for each document d, at 502, let $\theta_d$ be the per-document topic distribution, which is assumed to be drawn from a Dirichlet distribution with hyper-parameter α Dir(α). The documents may be a mixture of topics, and the multinomial random variable $z_{d,n}$ of a topic to appear in position n of document d is conditioned on $\theta_d$. At 503, each word appearing in document d, at position n, may, at 505, be selected according to another multinomial distribution with hyper-parameter β, conditioned on the chosen topic. In this way, each word has a probability that depends on its likelihood to appear in the document relevant to the topic. In summary, LDA may be seen as a generative process where documents are generated sequentially as shown in process 500, shown in FIG. 5.

By inverting the generative process, it is possible to infer the topics from the words appearing in the documents. So, given a document d the posterior distribution of the hidden variables $z_d$ and $\theta_d$ may be computed as follows:

$$p(\theta_d, z_d | w_d, \alpha, \beta) = \frac{p(\theta_d, z_d, w_d | \alpha, \beta)}{p(w_d | \alpha, \beta)},$$

where the vector $w_d$ represents the words observed in d, while the vector $z_d$ represents the positions of words in d. Both vectors have the same size, equal to the length of d. Statistical inference techniques, such as Gibbs sampling, may be employed to learn the underlying topic distribution $\theta_d$ of each document.

Finding Latent Topics from Query-Document Pairs. Given a training query log, a query topic classifier may be learned based on LDA. Since queries are short and lack context, it is difficult to train the model accurately. To circumvent this problem, the queries may be enriched with the content of their clicked pages whose URLs are available in the training query log. Thus a collection of query-document samples made of queries plus the text of their clicked results gathered from the Web may be created. In case, for a given query, the user did not click any results, or the clicked URL was not available any longer, the corresponding query from the set may be removed. In this way, a set of query-documents pairs may be obtained. Given a query-document pair, this content may be used as a proxy of the query, and LDA may be trained to learn the topic of the associated query.

The trained LDA classifier may return a distribution of topics for each query-document pair. Since it is assumed that a query can be assigned to only one topic, for the pair, the topic with the highest probability may be chosen. Iii the experiments, different query logs may be used with respect to the training one, and it may be assumed the IDA classifier is able to classify only queries already seen in the training query log, since for new queries it will lack the content of clicked pages.

Query Topic Assignment. Once the topics of the proxy query-documents are known, a single topic may be assigned to each query, Since the same query may appear in different query-document pairs, possibly assigned to different topics, which one of these topics to associate with the query may be determined. To this end, a simple voting scheme that assigns to each query the topic of the query-document that got more clicks by the users can be adopted. In doing so, the strong signal coming from clicks about the relevance of a document and its topic to the information need expressed by the query may be leveraged. Also, it allows estimation of the most popular topic that can be assigned to ambiguous queries, such as queries with more than one meaning that have more possible topics.

Estimating Topic Popularity. In some of the implementations of the temporal cache, an amount of cache entries proportional to the topic popularity may be assigned to each topic. Similarly to the static cache, where past popular queries are assumed popular in the future, it may be assumed that popular topics observed in the past remain popular in the future; so they get more entries in the temporal cache $\mathcal{T}$.

This topic popularity may be quantified as the number $q_\tau$ of distinct queries that belong to the topic τ. Note that this statistic may be computed over the training period. More in detail, let |$\mathcal{T}$| be the size of the temporal cache, q be the number of distinct queries in the training set, each topic τ∈{$T_1, T_2, \ldots, T_k$} will get a number of entries |$\mathcal{T} \cdot \tau$| equal to $$|\mathcal{T} \cdot \tau| = \left\lfloor \frac{|\mathcal{T}|}{q} \cdot q_\tau \right\rfloor.$$

For example, with a temporal cache with size |$\mathcal{T}$|=5 and 9 distinct queries observed in the training: 6 for the topic weather and 3 for education, there may be |$\mathcal{T}$.weather|=3 and |$\mathcal{T}$.education|=2.

DATASET DESCRIPTION. Query logs. For the experiments described below, two publicly available for research purposes query logs were used. One such query log includes about 29.8M queries (9.3M distinct queries). About 19M queries have at least one clicked URL, with 1.3M distinct URLs. The second query log consists of about 14.9M queries (6.2M distinct queries). About 8.8M queries have at least one clicked URL, with 3.4M distinct URLs.

Both query logs were partitioned into two portions, one for training purposes, for example, cache initialization, and one for testing the performance of the cache. The query logs were sorted by time and split into two fractions: X for the training set and 100−X for the test set with X=30%, 50%, and 70%. Only the results for the 70%-30% split are presented, but similar results were observed for the other training-test splits. In this case, the training (resp. test) set contains 6.7M (resp. 3.2M) unique queries for the first query log and 4.5M (resp. 2.1M) unique queries for the second query log.

Document Collections. Given the URLs from both query logs, the associated pages were collected from the Web, and 1M documents for the first query log and 2.1M documents for the second query log were gathered. Then, the text was extracted and pre-processed, for example, for stop-word removal, lemmatization, and stemming. Overly short and long documents (less than 5 and more than 100K words) were removed. Lastly, the documents were enriched with the corresponding query keywords.

LDA Topics. The LDA model was learned using 500K documents from the first query log and 350K documents from the second query log. The very frequent and rare words were removed from the dictionary, and the number k of topics to discover to 500 was set, estimated empirically. The approach was probabilistic; hence the topic detection can change with different collections and different number of topics. Other configurations were tried, such as changing the subsets of documents in the training set and using different values of k, such as 50, 100, and 500. The impact on the caching performance was observed to be negligible. Some of the topic keywords, extracted from the first query log dataset, are shown in Table 1.

TABLE 1

| Topic | Topic Keywords |
| --- | --- |
| Shopping | shop, order, item, ship, gift, custom, sale, return, account, cart |
| University | student, progam, faculti, campu, graduat, research, academ, alumni, colleg, univers |
| Weather | weather, forecast, snow, storm, rain, wind, winter, radar, flood, cold |
| Movies | movi, comic, news, star, theater, review, marvel, film, seri, comedi |
| Cooking | recip, cook, bean, chicken, chef, salad, cake, flavor, potato, rice |
| Travelling | travel, trip, destin, flight, vacat, book, deal, airlin, hotel, search |

Figure 6:
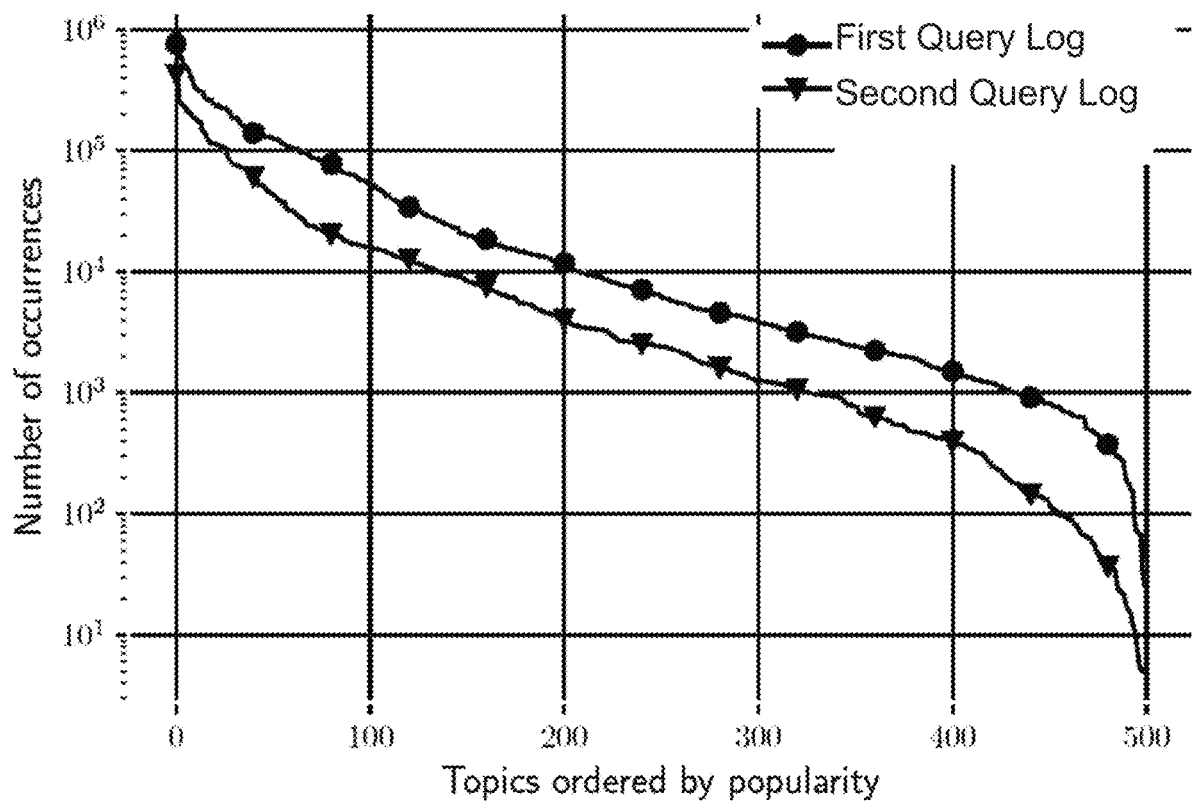
FIG. 6 illustrates exemplary results distribution of topic popularities for query logs, according to embodiments of the present systems and methods.

The distribution of topics extracted from both datasets is shown in FIG. 6. It is worth noting that the topic portion of STD cache exploits the subset of queries in the test set stream having a known topic. These queries are necessarily among those already encountered in the training set stream and successfully classified. The test queries that were not assigned to a topic compete instead for the use of the static and dynamic portions of the STD cache. The percentage of queries in the test set with a topic is 70% for the first query log and 58% for the second query log.

EXPERIMENTS. Experiments were run using the first and second query logs described above. For the caching simulations, the scenario of storing the query results in the cache, for example, the first SERP, was considered. The stream of queries was taken as input. If the query was found in the cache, there was a cache hit; otherwise, there was a cache miss, and in case the cache was full, the eviction policy was applied. For the experiments, the cache size N was set to different values: 64K, 128K, 256K, 512K, and 1024K. The data in the training set were used for three purposes: (1) learning the frequency of the queries and loading popular queries in the static cache(s), (2) training the LDA topic classifier from the queries (and clicked documents) and estimating their popularity for balancing the entries of the temporal cache(s), and (3) warming up the LRU cache(s). The cache performance was assessed in terms of hit rate, namely the number of cache hits in the test set divided by the number of queries in the test set.

For the experiments, the following caches were considered:

SDC: as baseline the traditional static and dynamic cache was used, where the dynamic portion is managed by LRU.

$STD_{LRU}^{f}$: the STD cache where the temporal cache is managed by LRU and all topics receive the same amount of entries.

$STD_{LRU}^{v}$: the STD cache where the temporal cache is managed by LRU and the topics receive an amount of entries that is proportional to the topic popularity, as explained above.

$STD_{SDC}^{v}$: the STD cache where the temporal cache is managed by SDC and whose size depends on the popularity of the topic. Compared to the previous two configurations, this cache has another parameter $f_t^s$ representing the static fraction of the SDC used inside the temporal cache. In the tests, two different implementations of this configuration were included. In the first implementation, the static cache S stores only the frequent queries with no topic (C1) as the popular queries assigned to a topic would be stored in the static portion of the corresponding temporal cache. Ire the second implementation (C2), the S stores all the top queries (with or without the topic). For popular queries with topic, the algorithm checks if they are already in S. If not, it stores them in the $f_t^s$ fraction of entries of the corresponding SDC used in temporal cache.

$T_{SDC}^{v}$: The cache entries are divided proportionally to the topic popularity and the no-topic queries that belong to an additional topic $\tau = T_{k+1}$.

For the baseline SDC cache and the proposed STD cache configurations, the static parameter $f_s$ varies from 0.0 to 1.0 with step of 0.1, while the other parameters ($f_t$ and $f_d$) are tuned based on the remaining size of the whole cache, for example, N (1−$f_s$). Regarding $STD_{SDC}^{v}$, the fraction of static of the SDC, caches used in the topic portion, $f_t^s$, is the same for all the topics. Experiments with variable $f_t^s$ estimates per topic were also performed, but the overall experimental results were similar to those achieved with a fixed $f_t^s$, and are not reported here. The following research questions were investigated:

RQ1. For a given cache size, is the proposed STD cache able to improve the hit rate performance metric with respect to SDC and, if so, adopting which configuration and optimal parameter values?

RQ2. Given the best STD competitor identified in RQ1, what is the impact of the other configuration parameters? In particular, given a static fraction $f_s$, what is the impact of the temporal and dynamic caches of STD with respect to the dynamic cache of SDC?

RQ3. How large are the hit rate improvements of the best STD configuration with respect to SDC, measured in term of the distance with the hit rate of a theoretical optimal caching strategy?

To address RQ1, a cache with a given number of entries was assumed, for example, N is defined by the system administrator, and the aim was to discover the best cache configuration and parameters in terms of hit rate. Table 2 reports the best hit rates obtained with SDC (our baseline) and the other topic-caching strategies for different cache sizes.

when $f_s$, increases, since we are allocating more space to S and, at some point, also infrequent no-topic queries are selected just to fill in the space. Nevertheless, (C2) does not suffer from this, since it stores in S the frequent queries (with or without topic), allowing a better utilization of the static fraction of the whole cache.

The $T_{SDC}^v$ cache has lower performance than the other STD configurations. In most of the cases it performs close to SDC, and for small caches it does not improve the baseline. Its results may allow better understanding of the benefit of using a temporal cache together with static and

TABLE 2

| Cache Size | Strategy | Query log 1 | | | | | Query log 2 | | | | |
|---|---|---|---|---|---|---|---|---|---|---|---|
| | | Hit Rate | $f_s$ | $f_t$ | $f_d$ | $f_t^2$ | Hit Rate | $f_s$ | $f_t$ | $f_d$ | $f_t^2$ |
| 64K | SDC | 53.20% | 0.8 | — | — | — | 45.08% | 0.9 | — | — | — |
| | $STD_{LRU}^f$ | 55.51% | 0.8 | 0.16 | 0.04 | — | 46.93% | 0.8 | 0.13 | 0.07 | — |
| | $STD_{LRU}^v$ | 56.16% | 0.8 | 0.13 | 0.07 | — | 47.53% | 0.9 | 0.05 | 0.05 | — |
| | $STD_{SDC}^v$ (C1) | 55.10% | 0.1 | 0.72 | 0.18 | 90% | 46.40% | 0.1 | 0.72 | 0.18 | 90% |
| | $STD_{SDC}^v$ (C2) | 56.21% | 0.8 | 0.16 | 0.04 | 30% | 47.54% | 0.8 | 0.13 | 0.07 | 60% |
| | $T_{SDC}^v$ | 53.16% | — | — | — | 80% | 43.04% | — | — | — | 80% |
| 128K | SDC | 55.84% | 0.9 | — | — | — | 47.93 % | 0.9 | — | — | — |
| | $STD_{LRU}^f$ | 58.40% | 0.8 | 0.16 | 0.04 | — | 50.05% | 0.9 | 0.07 | 0.03 | — |
| | $STD_{LRU}^v$ | 58.78% | 0.9 | 0.07 | 0.03 | — | 50.39% | 0.9 | 0.05 | 0.05 | — |
| | $STD_{SDC}^v$ (C1) | 57.98% | 0.1 | 0.72 | 0.18 | 90% | 49.48% | 0.1 | 0.72 | 0.18 | 90% |
| | $STD_{SDC}^v$ (C2) | 58.81% | 0.8 | 0.16 | 0.04 | 40% | 50.41% | 0.8 | 0.16 | 0.04 | 70% |
| | $T_{SDC}^v$ | 56.25% | — | — | — | 90% | 46.49% | — | — | — | 90% |
| 256K | SDC | 58.21% | 0.9 | — | — | — | 50.32% | 0.9 | — | — | — |
| | $STD_{LRU}^f$ | 60.88% | 0.8 | 0.16 | 0.04 | — | 52.67% | 0.8 | 0.16 | 0.04 | — |
| | $STD_{LRU}^v$ | 61.16% | 0.8 | 0.13 | 0.07 | — | 52.80% | 0.9 | 0.07 | 0.03 | — |
| | $STD_{SDC}^v$ (C1) | 60.64% | 0.1 | 0.72 | 0.18 | 90% | 52.23% | 0.1 | 0.72 | 0.18 | 90% |
| | $STD_{SDC}^v$ (C2) | 61.20% | 0.8 | 0.16 | 0.04 | 10% | 52.90% | 0.8 | 0.16 | 0.04 | 80% |
| | $T_{SDC}^v$ | 59.14% | — | — | — | 90% | 49.82% | — | — | — | 90% |
| 512K | SDC | 60.57% | 0.7 | — | — | — | 52.53% | 0.9 | — | — | — |
| | $STD_{LRU}^f$ | 63.10% | 0.8 | 0.16 | 0.04 | — | 54.91% | 0.9 | 0.08 | 0.02 | — |
| | $STD_{LRU}^v$ | 63.48% | 0.7 | 0.20 | 0.10 | — | 55.03% | 0.9 | 0.08 | 0.02 | — |
| | $STD_{SDC}^v$ (C1) | 63.24% | 0.1 | 0.72 | 0.18 | 80% | 54.96% | 0.2 | 0.64 | 0.16 | 90% |
| | $STD_{SDC}^v$ (C2) | 63.55% | 0.7 | 0.24 | 0.06 | 10% | 55.06% | 0.7 | 0.24 | 0.06 | 40% |
| | $T_{SDC}^v$ | 61.91% | — | — | — | 70% | 52.78% | — | — | — | 90% |
| 1024K | SDC | 62.76% | 0.7 | — | — | — | 54.30% | 0.9 | — | — | — |
| | $STD_{LRU}^f$ | 65.16% | 0.8 | 0.13 | 0.07 | — | 56.70% | 0.9 | 0.08 | 0.02 | — |
| | $STD_{LRU}^v$ | 65.67% | 0.6 | 0.27 | 0.13 | — | 57.04% | 0.5 | 0.40 | 0.10 | — |
| | $STD_{SDC}^v$ (C1) | 65.57% | 0.1 | 0.72 | 0.18 | 60% | 57.01% | 0.2 | 0.64 | 0.16 | 80% |
| | $STD_{SDC}^v$ (C2) | 65.59% | 0.6 | 0.32 | 0.08 | 10% | 57.21% | 0.5 | 0.40 | 0.10 | 50% |
| | $T_{SDC}^v$ | 64.56% | — | — | — | 70% | 55.50% | — | — | — | 90% |

For each caching strategy, the values of the $f_s$, $f_t$, $f_d$, and $f_t^s$ that achieved the best hit rates are also reported. As shown, not all parameters are used by all the cache configurations, so for those caches where the parameter is not needed the symbol—is used. For each cache size, the best hit rates are highlighted in bold. The experiments showed that with both datasets the STD caches always perform better than SDC in terms of hit rate. In particular, the approach $STD_{SDC}^v$ performs better than the others with the exception of the first query log and N=1024K, where $STD_{LRU}^v$ beats it, even though the difference between the two hit rates is minimal, for example, less than 0.1%.

As expected, $STD_{LRU}^f$ performs worse than $STD_{LRU}^v$, as it gives to each topic the same number of entries instead of allocating the temporal cache entries proportionally to the topic popularity. Moreover, $STD_{SDC}^v$ (C1) cache exhibits lower hit rates compared to $STD_{SDC}^v$ (C2) and $STD_{LRU}^v$ caches. Analyzing the cache misses encountered with (C1), it is seen that this reduction of performance is due to the fact that the static cache S of (C1) hosts only the results of no-topic queries. Some of these queries may be not very popular; hence storing them in the static fraction causes a lower hit rate in static with a reduction of the overall performance. In particular, this phenomenon is more evident dynamic caches. In $STD_{LRU}^f$, $STD_{LRU}^v$, and $STD_{SDC}^v$, the amount of entries dedicated to the no-topic queries is limited by the parameter $f_d$. Hence, there is a fair division of the cache space among the queries belonging to a topic and those that could not be classified. On the other hand, in $T_{SDC}^v$ the no-topic queries are treated as queries belonging to an extra topic ($T_{k+1}$) so the amount of entries is proportional to the popularity of the (k+1)-th topic, penalizing the other k topics. Since in the data most of the queries are not classified, this leads to an unbalanced splitting of the space between the no-topic queries and the others.

There are several reasons why the STD cache outperforms the SDC baseline. For example, since the higher STD hit rate is due to less misses encountered, the average distance of misses in the test streams (average miss distance) was analyzed. This distance is defined as the number of queries between two misses that were caused by the same query, for example, for the stream A B C A D A F G A and a cache of size 2, the misses caused by A have an average distance of 2. For this experiment, caches with 1024K entries and $f_s$=0.6 were considered, as it gave the best hit-rate performance for $STD_{SDC}^v$. For STD the best configuration was used, such as $STD_{SDC}^v$ (C2), and the average miss distance of its dynamic cache from the average miss distance of its temporal caches was separately identified. Notice that the static cache does not impact on the analysis since it is populated by the same top frequent queries for both STD and SDC caches.

Figure 7:
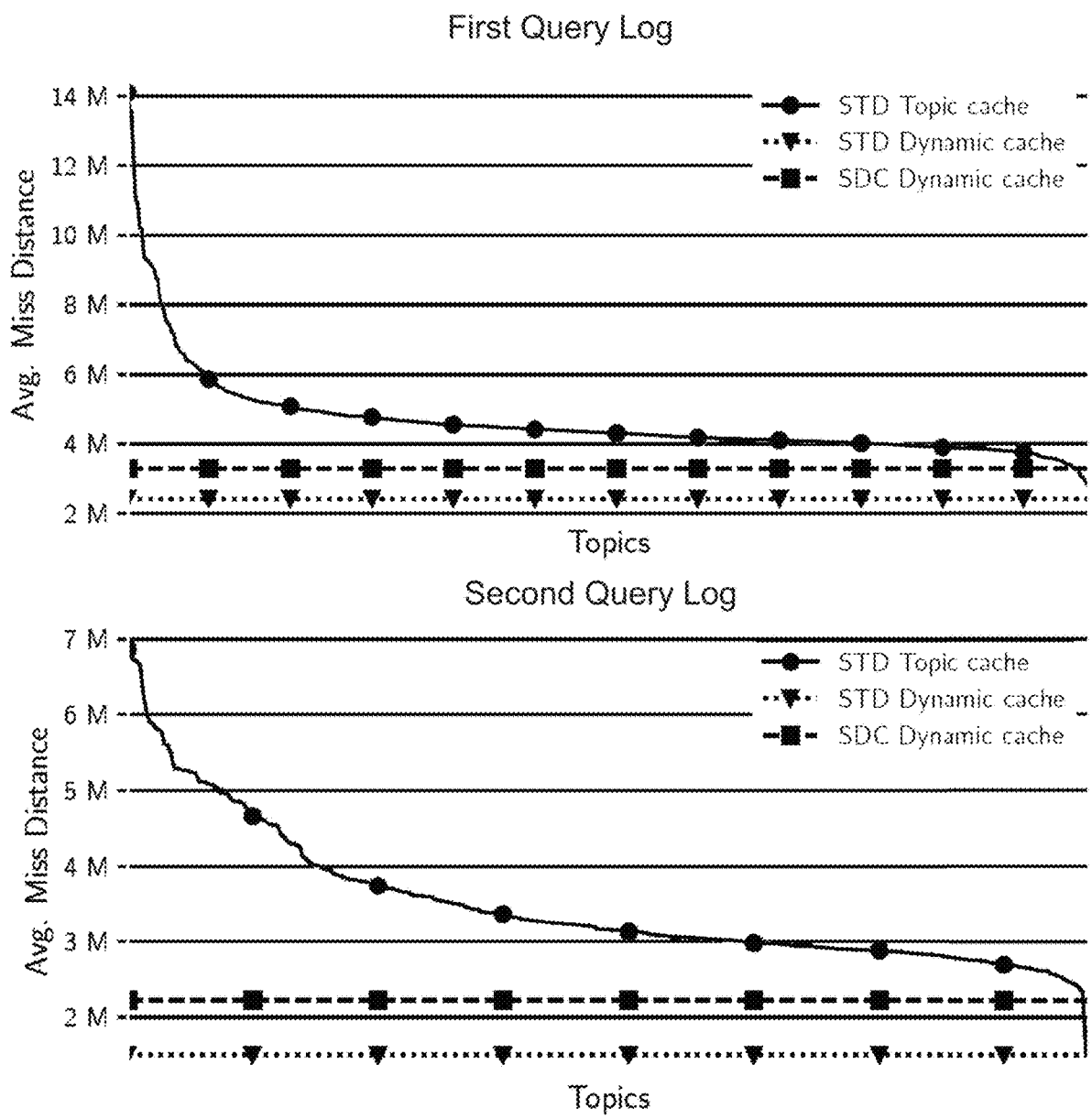
FIG. 7 illustrates exemplary per-topic average miss distances for query logs, according to embodiments of the present systems and methods.

The results are shown in FIG. 7. The curves represent the average miss distances for the temporal caches sorted by decreasing values, and we use it as a proxy of temporal locality. On the left are large distances, which means that a miss occurred only when the repeated requests of that query were far away from each other. Notice that the number of topics can be lower than 500 since for some topics there are no misses. The average miss distances for the dynamic caches in SDC and STD are constant as they are topic-independent. These two average miss distances are lower when compared to those reported for most of the temporal caches. It confirms that an LRU dynamic cache captures the repeated requests only if they are close to each other (small average miss distance) On the other hand temporal caches have large average miss distances. So, the advantage of a temporal cache with space divided in a proportional way among the topics is that it allows to serve even requests distant from each other on a per-topic base, such as with different temporal localities.

To conclude on RQ1, the experimental results confirmed that on equal cache sizes the STD approach can improve SDC, allowing an improvement up to ~3% of the hit rate. The best configuration is $STD_{SDC}{}^v(C2)$ as confirmed by simulations on two real-world query logs. Moreover, this performance improvement is justified by the analysis of the average miss distances. In fact, in STD the misses occurring in the temporal caches are caused by repeated requests that are much more distant in the query stream as compared to the misses that are encountered in traditional SDC. To address RQ2, and see if the improvement of $STD_{SDC}{}^v(C2)$ over SDC is consistent, their hit rates were compared varying the cache size and the value of $f_s$. Since the size of the static portion changes with $f_s$, the remaining $N \cdot (1-f_s)$ entries were split between the topic and dynamic caches using different proportions. The results were obtained with 80% for the temporal cache and 20% for the dynamic cache, while the $f_t^s$ parameter was set to 40%. Consistent results were observed for other parameter values.

FIG. 8 shows the hit rates for the two approaches, using dashed lines for SDC and solid lines for $STD_{SDC}{}^v(C2)$. Notice that we omit the hit rates for $f_s=0.0$ and $f_s=1.0$ as they correspond to completely dynamic and static caches, and the performance among the approaches is the same. Observing the curves for N=64K, SDC hit rates (dashed lines) are always lower than $STD_{SDC}{}^v$ hit rates (solid line). The gap of hit rates between these two caching approaches goes from ~5% for $f_s=0.1$ to ~3% for $f_s=0.9$. As expected, the maximum improvement is registered for lower values of $f_s$, since the impact of a topic plus a dynamic cache of STD over the only dynamic cache of SDC is more evident. A similar result is observed also for the other cache sizes.

Regarding RQ2, the $STD_{SDC}{}^v$ cache always outperforms the SDC cache, with an average gap of 3.73% for the first query log and 3.68% for the second query log, and a maximum gap of more than 5% on both query logs.

To answer RQ3, the best hit rates achieved with STD and SDC were compared against the best hit rate that can be achieved with an optimal cache policy. Bélády's optimal algorithm (also known as the clairvoyant algorithm) was used, which always evicts the element that will not be requested for the longest time. It is not feasible in practice as it assumes to know the future requests, but it optimizes the number of hits, and it gives us an upper bound of the performance over which no other caching strategy can improve. The gaps between Bélády hit rates and the ones achieved with the best SDC and STD configurations were computed. The results are shown in Table 3. As shown, the hit rates of STD are very close to Bélády hit rates for all cache sizes (the gap is reported in the 6th column of Table 3). The average gap between the hit rates of STD and Bélády is 5.70% for the first query log and 5.22% for the second query log (averaged over the size of the cache). On the other hand, the distance between SDC hit rate and Bélády hit rate is bigger (see the 5th column). The average gap between them is 8.67% for the first query log and 7.81% for the second one. To quantify the gap reduction, the relative delta between the two gaps was computed (see the 7th column). It gives an indication on how much STD improves SDC with respect to the Bélády hit rate. To conclude on RQ3, STD hit rates achieve a significant gap reduction with respect to SDC from the theoretical optimal hit rate, which is up to 35.96% for the first query log and up to 39.06% for the second one.

TABLE 3

| Cache Size | Bélády | Best SDC | Best STD | Gap SDC | Gap STD | Gap Reduction |
|---|---|---|---|---|---|---|
| Query log 1 ||||||| 
| 64K | 61.57% | 53.20% | 56.21% | 8.37% | 5.36% | 35.96% |
| 128K | 64.41% | 55.84% | 58.81% | 8.57% | 5.60% | 34.66% |
| 256K | 67.11% | 58.21% | 61.20% | 8.90% | 5.91% | 33.60% |
| 512K | 69.35% | 60.57% | 63.55% | 8.78% | 5.80% | 33.94% |
| 1024K | 71.51% | 62.76% | 65.67% | 8.75% | 5.84% | 33.26% |
| Query log 2 |||||||
| 64K | 52.07% | 45.08% | 47.54% | 6.99% | 4.53% | 35.19% |
| 128K | 55.22% | 47.93% | 50.41% | 7.29% | 4.81% | 34.02% |
| 256K | 58.44% | 50.32% | 52.90% | 8.12% | 5.54% | 31.77% |
| 512K | 61.75% | 52.53% | 55.06% | 9.22% | 6.69% | 27.44% |
| 1024K | 61.75% | 54.30% | 57.21% | 7.45% | 4.54% | 39.06% |

CONCLUSIONS

Embodiments of the present systems and methods may provide a Static-Temporal-Dynamic (STD) cache, which leverages the query topics for a better cache space utilization and a consequent improvement of the hit rate. Compared to the traditional SDC cache, embodiments of the STD cache store queries belonging to a given topic in a dedicated portion of the cache where for each topic the number of entries available is proportional to the topic popularity. Embodiments may capture queries that are frequently requested at large intervals of time and would be evicted in a cache only managed by the LRU policy. Extensive reproducible experiments conducted with two real-world query logs show that STD may increase the cache hit rate by more than 3 percent over SDC. Such large improvements may result in a hit rate gap reduction with respect to Bélády's optimal caching policy by up to ~39% over SDC, depending on the query log and the total size of the cache. The greater hit rate achieved by embodiments of the query-result cache do not require specific investments by the search engine companies. The query topic classification service is, in general, already deployed for other purposes, while embodiments of the caching solution may be managed entirely by software, and may be easily implemented and deployed in existing Web search systems.

Figure 9:
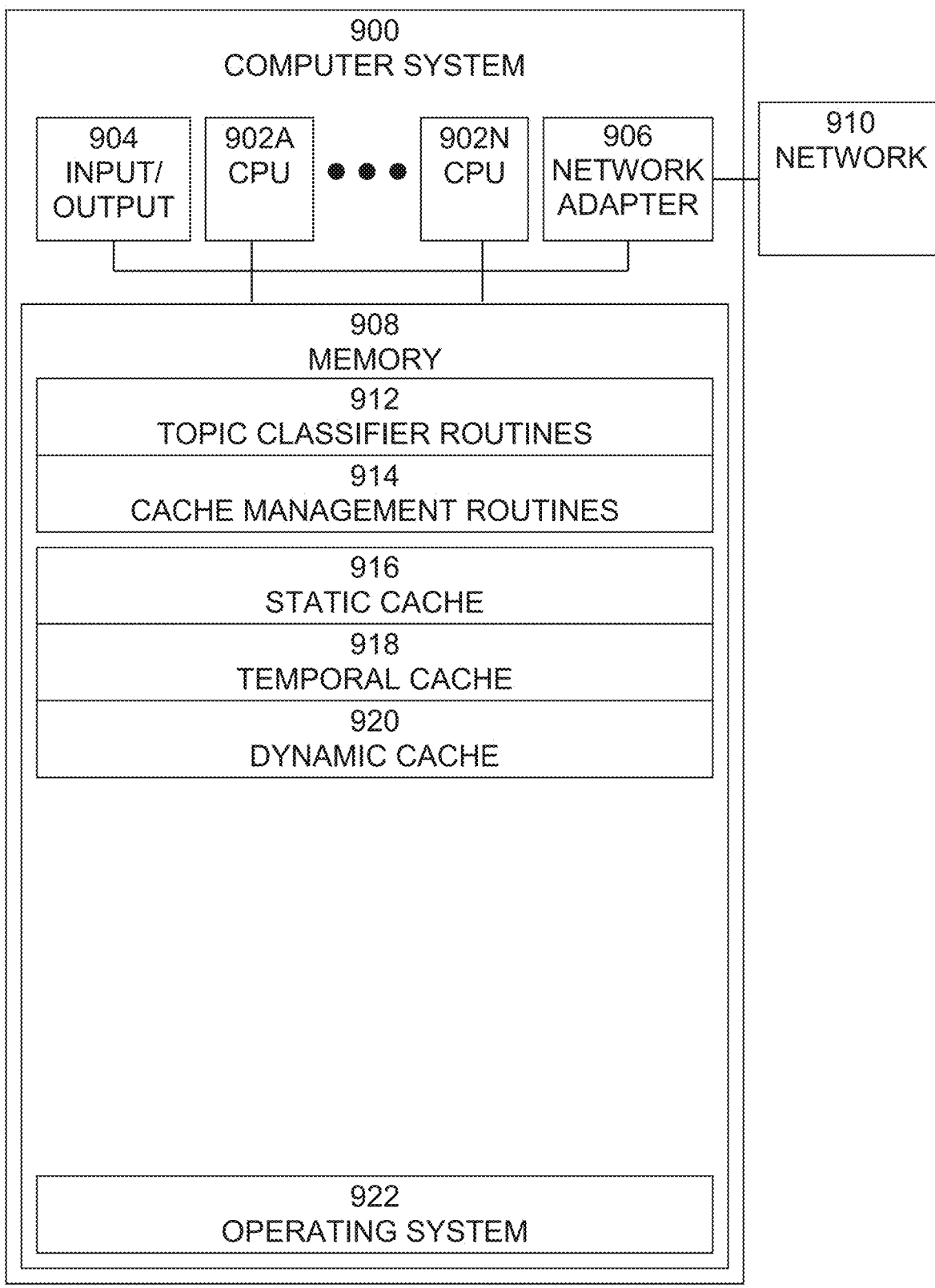
FIG. 9 is an exemplary block diagram of a computer system, in Which processes involved in the embodiments described herein may be implemented.

An exemplary block diagram of a computer system 900, in which processes involved in the embodiments described herein may be implemented, is shown in FIG. 9. Computer system 900 may be implemented using one or more programmed general-purpose computer systems, such as embedded processors, systems on a chip, personal computers, work stations, server systems, and minicomputers or mainframe computers, or in distributed, networked computing environments. Computer system 900 may include one or more processors (CPUs) 902A-902N, input/output circuitry 904, network adapter 906, and memory 908. CPUs 902A-902N execute program instructions to carry out the functions of the present communications systems and methods. Typically, CPUs 902A-902N are one or more microprocessors, such as an INTEL CORE® processor. FIG. 9 illustrates an embodiment in which computer system 900 is implemented as a single multi-processor computer system, in which multiple processors 902A-902N share system resources, such as memory 908, input/output circuitry 904, and network adapter 906. However, the present communications systems and methods also include embodiments in which computer system 900 is implemented as a plurality of networked computer systems, which may be single-processor computer systems, mufti-processor computer systems, or a mix thereof.

Input/output circuitry 904 provides the capability to input data to, or output data from, computer system 900. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 906 interfaces device 900 with a network 910. Network 910 may be any public or proprietary LAN or WAN, including, but not limited to the Internet.

Memory 908 stores program instructions that are executed by, and data that are used and processed by, CPUs 902A-902B to perform the functions of computer system 900. Memory 908 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 908 may vary depending upon the function that computer system 900 is programmed to perform. In the example shown in FIG. 9, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 9, memory 908 may include topic classifier routines 912, cache management routines 914, static cache 916, temporal cache 918, dynamic cache 920, and operating system 922. Topic classifier routines 912 may include software routines to determine a topic or topics associated with query, using, for example, a Latent Dirichlet Allocation (LDA), as described above. Cache management routines 914 may include software routines to determine hits or misses in the cache, as well as to add, delete, and update entries in the cache, as described above. Static cache 916 may include memory to store the most popular results, as described above. The temporal cache 918 may include memory to store results based on topic, as well as popularity, as described above. Dynamic cache 920 may include memory to store results that may be requested frequently for over a short period of time, as described above. Operating system 922 may provide overall system functionality.

As shown in FIG. 9, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the tennis task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PIA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for query processing implemented in a computer system comprising a processor, a memory configured to store program instructions and data, and program instructions executable by the processor to perform:
   receiving a plurality of queries for data;
   determining at least one topic associated with at least one query of the plurality of queries; and
   requesting data responsive to the at least one query of the plurality of queries from a data cache comprising a temporal cache,
      wherein the temporal cache is configured to store data based on a topic associated with the data and is configured to retrieve data based on the determined at least one topic, and wherein the data cache is configured to retrieve data responsive to the at least one query of the plurality of queries from the computer system.

2. The method of claim 1, wherein the data cache further comprises either a static cache or a dynamic cache.

3. The method of claim 1, wherein the temporal cache is further partitioned into a plurality of topic portions.

4. The method of claim 3, wherein each topic portion of the plurality of topic portions is configured to store data relating to the associated topic.

5. The method of claim 4, wherein the associated topic is selected from among determined topics of queries received by the computer system.

6. The method of claim 3, wherein each topic portion is further partitioned into a static portion configured to store data entries indefinitely, and into a dynamic portion configured to store data entries until each least recently used data entry is replaced by a newer data entry.

7. A method for query processing implemented in a computer system comprising a processor, a memory configured to store program instructions and data, and program instructions executable by the processor to perform:
receiving a plurality of queries for data;
determining at least one topic associated with at least one query of the plurality of queries; and
requesting data responsive to the at least one query of the plurality of queries from a data cache comprising a temporal cache,
wherein the temporal cache is configured to store data based on a topic associated with the data and is configured to retrieve data based on the determined at least one topic, and wherein the data cache is configured to retrieve data responsive to the at least one query of the plurality of queries from the computer system;
wherein requesting the data responsive to the at least one query of the plurality of queries from the data cache comprises: determining at least one topic associated with the at least one query of the plurality of queries and requesting data responsive to the at least one query of the plurality of queries from the temporal cache using the at least one determined topic.

8. The method of claim 7, wherein the data cache further comprises either a static cache or a dynamic cache.

9. The method of claim 7, wherein the temporal cache is further partitioned into a plurality of topic portions.

10. The method of claim 9, wherein each topic portion of the plurality of topic portions is configured to store data relating to the associated topic.

11. The method of claim 10, wherein, wherein the associated topic is selected from among determined topics of queries received by the computer system.

12. The method of claim 9, wherein each topic portion is further partitioned into a static portion configured to store data entries indefinitely, and into a dynamic portion configured to store data entries until each least recently used data entry is replaced by a newer data entry.

13. A system for query processing comprising:
a computer system comprising a processor, a memory configured to store program instructions and data, and program instructions executable by the processor to perform:
receiving a plurality of queries for data;
determining at least one topic associated with at least one query of the plurality of queries; and
requesting data responsive to the at least one query of the plurality of queries from a data cache comprising a temporal cache,
wherein the temporal cache is configured to store data based on a topic associated with the data and is configured to retrieve data based on the determined at least one topic, and wherein the data cache is configured to retrieve data responsive to the at least one query of the plurality of queries from the computer system.

14. The system of claim 13, wherein the data cache further comprises either a static cache or a dynamic cache.

15. The system of claim 13, wherein the temporal cache is further partitioned into a plurality of topic portions.

16. The system of claim 15, wherein each topic portion of the plurality of topic portions is configured to store data relating to the associated topic.

17. The system of claim 16, wherein, wherein the associated topic is selected from among determined topics of queries received by the computer system.

18. The system of claim 15, wherein each topic portion is further partitioned into a static portion configured to store data entries indefinitely, and into a dynamic portion configured to store data entries until each least recently used data entry is replaced by a newer data entry.

\* \* \* \* \*